(12) United States Patent
Ravaglia (10) Patent No.: US 10,537,068 B2
(45) Date of Patent: Jan. 21, 2020

(54) APPARATUS AND MACHINE FOR TRANSFERRING AGRICULTURAL PRODUCTS, IN AN AGRICULTURAL MACHINE

(71) Applicant: KVERNELAND GROUP RAVENNA S.R.L., Russi (IT)

(72) Inventor: Paolo Ravaglia, Bagnacavallo (IT)

(73) Assignee: KVERNEKAND GROUP RAVENNA S.R.L., Russi (IT)

( * ) Notice: Subject to any disclaimer, the term of this patent is extended or adjusted under 35 U.S.C. 154(b) by 0 days.

(21) Appl. No.: 16/035,899

(22) Filed: Jul. 16, 2018

(65) Prior Publication Data
US 2019/0053435 A1 Feb. 21, 2019

Related U.S. Application Data

(63) Continuation of application No. 15/102,877, filed as application No. PCT/EP2014/076192 on Dec. 2, 2014, now Pat. No. 10,021,835.

(30) Foreign Application Priority Data

Dec. 13, 2013 (EP) .................................... 13425158

(51) Int. Cl.
| A01F 15/10 | (2006.01) |
| A01D 89/00 | (2006.01) |
| A01F 15/07 | (2006.01) |

(52) U.S. Cl.
CPC .......... *A01F 15/106* (2013.01); *A01D 89/002* (2013.01); *A01F 15/07* (2013.01); *A01F 15/10* (2013.01)

(58) Field of Classification Search
CPC ........ A01F 15/106; A01F 15/07; A01F 15/10; A01F 2015/107; A01F 2015/108;
(Continued)

(56) References Cited

U.S. PATENT DOCUMENTS

| 5,819,517 A * | 10/1998 | Amanatidis | ............ A01D 90/04 56/341 |
| 6,298,646 B1 * | 10/2001 | Schrag | .................. A01F 15/101 100/88 |

(Continued)

FOREIGN PATENT DOCUMENTS

| DE | 19717542 A1 * | 10/1998 | ............. A01D 90/04 |
| DE | 19841598 A1 * | 3/2000 | ............. A01D 90/04 |
| EP | 1062860 A2 * | 12/2000 | ............. A01F 15/10 |

*Primary Examiner* — Arpad Fabian-Kovacs
(74) *Attorney, Agent, or Firm* — Cooper Legal Group, LLC (57) ABSTRACT

An apparatus for transferring agricultural products, for agricultural machines designed for the formation of a bale is provided. The transfer apparatus includes at least one impeller rotor, which can be arranged between a pick-up drum of agricultural products and a chamber for the compression of the agricultural products. The rotor is facing a deck, for delimiting at least partially a channel. The deck is coupled to a fixed frame by way of at least two supports which can move on command. At least one first support includes at least one support pin, which is coupled to a first portion of the deck and moved, in a corresponding guiding slot, by a corresponding actuator. At least one second support includes at least one crank, which is coupled to a second portion of the deck and rotatable about a rotation axis that is perpendicular to the advancement direction.

20 Claims, 10 Drawing Sheets

(58) Field of Classification Search
CPC ........ A01F 29/10; A01F 12/28; A01F 15/101; A01D 89/002; A01D 90/04; A01D 89/008; A01D 90/02
See application file for complete search history.

(56) References Cited

U.S. PATENT DOCUMENTS

| | | | | |
|---|---|---|---|---|
| 6,370,856 | B1* | 4/2002 | Engel | A01D 90/02 56/341 |
| 6,679,042 | B1* | 1/2004 | Schrag | A01F 15/10 56/341 |
| 7,654,069 | B1* | 2/2010 | Dunham | A01D 89/008 56/190 |
| 8,056,314 | B1* | 11/2011 | Anstey | A01F 15/106 56/364 |
| 9,226,452 | B2* | 1/2016 | Biziorek | A01F 15/106 |
| 9,526,214 | B2* | 12/2016 | McClure | A01F 15/106 |
| 9,549,506 | B2* | 1/2017 | McClure | A01F 15/08 |
| 9,713,306 | B2* | 7/2017 | Singh | A01F 15/07 |
| 9,764,327 | B2* | 9/2017 | Bergmann | A01F 15/10 |
| 2008/0028737 | A1* | 2/2008 | Viaud | A01F 17/00 56/341 |
| 2008/0028738 | A1* | 2/2008 | Viaud | A01F 15/106 56/341 |
| 2013/0167498 | A1* | 7/2013 | Haycocks | A01F 15/08 56/341 |
| 2014/0096692 | A1* | 4/2014 | Baldauf | A01F 15/10 100/97 |

* cited by examiner

APPARATUS AND MACHINE FOR TRANSFERRING AGRICULTURAL PRODUCTS, IN AN AGRICULTURAL MACHINE

The present invention relates to an apparatus for transferring agricultural products, and related agricultural machine.

In the agricultural sector round balers are now widespread, i.e. agricultural machines capable of making cylindrical bales that are made up of a predetermined agricultural product that is preventively cut (grass, grain, maize, hay, forage etc.). Such machines are thus first of all provided with a pick-up drum, which is constituted by a first rotating shaft that is provided with teeth and is capable of retrieving the agricultural product, which, after having first been cut, has also been piled on the ground along prearranged rows (also called "windrows").

While the baler moves, following the path defined by the windrows, the pick-up drum lifts the product that it progressively encounters and pushes it toward a compression chamber which is arranged at the rear and is provided with elements (rollers, belts or catenaries), which are arranged along the perimeter of the inner space of the (substantially cylindrical) chamber, and which entrain the product itself and make the formation of the bale possible.

In conventional round balers, the pick-up drum is normally not capable of independently providing for the transfer of the product from the ground to the compression chamber, and thus another, intermediate apparatus is used, which is capable of providing the necessary thrust, so that the product will reach the chamber.

In more detail, the apparatus designed to move the cut agricultural product is usually made up of a rotor constituted by a second rotating shaft, provided with a plurality of teeth which have alternating motion and which face toward a lower deck, which, together with two side walls, basically delimits a channel leading to the space of the compression chamber.

The product thus drags on the deck, pushed by the teeth, which, for this function, penetrate into the product and push it on the deck and toward the compression chamber.

In this manner, the rotor is capable of imposing an upper thrust on the product and furthermore, if especially provided with blades, it can further cut and shred the product during the passage through the channel.

Such implementation solution is not however devoid of drawbacks.

In fact, it must be noted that the distribution on the ground of the agricultural product to be collected is not always uniform, and not infrequently the baler encounters, during its advancement, portions of the windrow in which the product is in short supply and others in which the product is present in great quantities.

When the pick-up drum encounters and lifts great localized accumulations of product, the heavy mass of material transferred to the rotor can result in its being jammed (with consequent interruption of the feeding), since the teeth cannot fully penetrate between the product, as a result jamming, and hence the rotor cannot transfer the collected material to the compression chamber.

In such eventuality, the operator can try to manually remove the blockage, but it is evident that such operation is very burdensome (and sometimes dangerous), in that the product, compressed in the channel, is resistant to extraction, and inevitably forces extended pauses, which are naturally unwelcome.

Alternatively (or as an aid to the manual intervention of the operator), some conventional round balers are provided with a deck that, actuated by two laterally adjacent hydraulic cylinders, can be lowered as needed, thus widening the passage opening of the channel and facilitating the removal of the blockage.

In more detail, the two cylinders make the deck rotate about an axis that is transverse to the advancement direction and is arranged between the pick-up drum and the rotor: therefore, while the edge of the deck arranged upstream (facing the pick-up drum) is kept substantially fixed, the opposite edge is lowered, in order to ensure the widening of the passage opening.

It therefore seems evident that the widening of the passage opening is not uniform: in the region of the inlet, in fact, where the deck is pivoted and the aforementioned transverse axis is found, the increase in cross-section is practically zero, and the overall benefit is thus limited.

Therefore, the contrivance described above makes it possible to resolve jamming to a modest extent, but it is entirely ineffective against heavy accumulations of product (thus requiring the manual intervention of the operator).

The aim of the present invention is to solve the above mentioned problems, by devising an apparatus that enables the transfer of agricultural products, toward the compression chamber, even in the event of heavy accumulations of the products.

Within this aim, an object of the invention is to provide an agricultural machine provided with an apparatus capable of transferring agricultural products, toward the compression chamber, even in the event of heavy accumulations of those products.

Another object of the invention is to provide an apparatus capable of performing the transfer of products with a structure that is simple and low cost.

Another object of the invention is to provide an apparatus that makes it possible to remove any blockages rapidly.

A further object of the invention is to provide an apparatus that ensures a high reliability of operation and can operate without requiring the manual intervention of the operator for the removal of any blockages.

Another object of the invention is to provide an apparatus that can be easily implemented using elements and materials that are readily available on the market.

Another object of the invention is to provide an apparatus and an agricultural machine that are low cost and safely applied.

This aim and these objects are achieved by an apparatus for transferring agricultural products, for agricultural machines designed for the formation of a bale, which comprises at least one impeller rotor, which can be arranged between a pick-up drum of agricultural products, of the type of grass, grain, maize, hay, forage, and the like, and a chamber for the compression of the agricultural products, for the formation of the bale, said rotor facing a deck, for delimiting at least partially a channel for transferring the agricultural products, which are pushed by said rotor, from the pick-up drum to the chamber, characterized in that said deck is coupled to a fixed frame by way of at least two supports which can move on command, at least one first support comprising at least one support pin, which is coupled to a first portion of said deck and moved, in a corresponding guiding slot, by a corresponding actuator, at least one second support comprising at least one crank, which is coupled to a second portion of said deck and rotatable about a rotation axis that is perpendicular to the advancement direction.

This aim and these objects are also achieved by an agricultural machine, for the formation of bales, which comprises a pick-up drum of agricultural products, of the type of grass, grain, maize, hay, forage, and the like, and an apparatus for transferring the agricultural products received from said pick-up drum to a compression chamber, designed for the formation of the bale, said transfer apparatus comprising at least one impeller rotor, which is arranged between said pick-up drum and said compression chamber and facing a deck, for delimiting at least partially a channel for transferring the agricultural products, which are pushed by said rotor, from said pick-up drum to said chamber, characterized in that said deck is coupled to a fixed frame by way of at least two supports which can move on command, at least one first support comprising at least one support pin, which is coupled to a first portion of said deck and moved, in a corresponding guiding slot, by a corresponding actuator, at least one second support comprising at least one crank, which is coupled to a second portion of said deck and rotatable about a rotation axis that is perpendicular to the advancement direction.

Further characteristics and advantages of the invention will become better apparent from the description of a preferred, but not exclusive, embodiment of the apparatus (and of the machine) according to the invention, which is illustrated by way of non-limiting example in the accompanying drawings wherein.

With particular reference to the figures, the reference numeral 1 generally designates an apparatus for transferring agricultural products, for agricultural machines designed for the formation of a bale.

The transfer apparatus 1 comprises first of all an impeller rotor 2, which can be arranged between a pick-up drum of agricultural products and a compression chamber thereof, which is adapted to the formation of the bale (cylindrical for example, but not exclusively).

It should be noted from this point onward that the use of the transfer apparatus 1 according to the invention in agricultural machines of the type described above shall constitute the preferred application of the invention, and constant reference shall be made to it in the present discussion. This notwithstanding, the possibility is not ruled out of using the transfer apparatus 1 in different types of agricultural machines (optionally making them interact with other devices thereof), while remaining within the scope of protection claimed herein.

With further reference to the preferred, but not exclusive, application, it should be noted that the agricultural products mentioned above can be of the type of grass, grain, maize, hay, forage, and the like: while the agricultural machine (and with it the transfer apparatus 1 according to the invention) is moved along an agricultural terrain, it can lift, by way of the pick-up drum, and substantially according to conventional methods, the above mentioned agricultural products (usually already cut and piled along prearranged rows, called "windrows"), which are then transferred by the apparatus 1 to the chamber, for the formation of the bale.

It should furthermore be noted that the agricultural machine, on which the apparatus 1 according to the invention is arranged, can be of the type intended to be drawn by a respective tractor (or other means of locomotion), or of the type equipped with a drive unit (and with a corresponding driving station, for an operator).

Precisely in order to allow the transfer of the agricultural products, the rotor 2 is facing toward a (lower) deck 3, so as to delimit a channel 4 for the transfer of the agricultural products from the pick-up drum to the chamber, while they are pushed by the rotor 2.

The deck 3 can be made of any material at will, and be simply constituted by a flat plate, or it can take other shape structures, according to specific requirements.

According to the invention, the deck 3 is coupled to a fixed frame 5 by way of at least two supports 6 and 7 which can move on command: at least one first support 6 comprises at least one support pin 8, which is coupled to a first portion of the deck 3 and is moved, within a corresponding guiding slot 9, by a corresponding actuator 10.

Furthermore, at least one second support 7 comprises at least one crank 11, which is coupled to a second portion of the deck 3 (and conveniently spaced from the first portion) and can rotate about a rotation axis A that is perpendicular to the advancement direction.

In particular, the crank 11 is mounted idle about a respective fulcrum 12: in this manner, it can rotate, about the rotation axis A that is perpendicular to the advancement direction, as a consequence of the movement of the pin 8 by the actuator 10.

So in fact, when the actuator 10 is actuated in order to move the pin 8 inside the guiding slot 9, the actuator 10 itself and the pin 8 (automatically) entrain the crank 11 in rotation about the fulcrum 12, thus achieving a more effective movement of the deck 3 for the purpose of removing blockages.

On the other hand, as long as the pin 8 is kept immobile (since no movement is imparted by the actuator 10), the crank 11 also remains immobile. As can also be seen from the figures, the peculiar structure of the apparatus 1 according to the invention is in fact such as to confer on the deck 3 a single degree of freedom, controlled by the actuator 10, even though thanks to the latter the deck 3 can be lowered and/or raised both at the pin 8 and at the crank 11, thus achieving the advantages which will be described in the following pages.

In an embodiment of significant practical interest, shown in the accompanying figures for the purposes of non-limiting example of the application of the invention, the crank 11 and the fulcrum 12 are arranged in proximity to the inlet of the channel 4, facing the pick-up drum; in a specular manner, the pin 8, the corresponding guiding slot 9 and the actuator 10 are arranged in proximity to the outlet of the channel 4, facing the compression chamber.

It can thus be seen that following the actuation of the actuator 10 alone (by the operator), both the pin 8 and the crank 11 impose a movement on the respective portions of the deck 3, which are basically arranged at the ends of the transfer channel 4 and thus the variation (the widening) of the passage section of the channel 4 affects the entire length of the deck 3, differently from what occurs in conventional agricultural machines.

Even more specifically, in the solution proposed in the accompanying figures, for the purposes of non-limiting example, a front flap 3a of the deck 3, which basically defines the second portion, is wrapped rotatably around a tube 11a that is integral with the crank 11.

Therefore, actuation of the actuator 10 (in addition to driving the movement of the pin 8) causes the movement of the front flap 3a of the panel 3 and the rotation of the crank 11, which is coupled rigidly to the tube 11a, which can rotate inside the front flap 3a.

Figure 1:
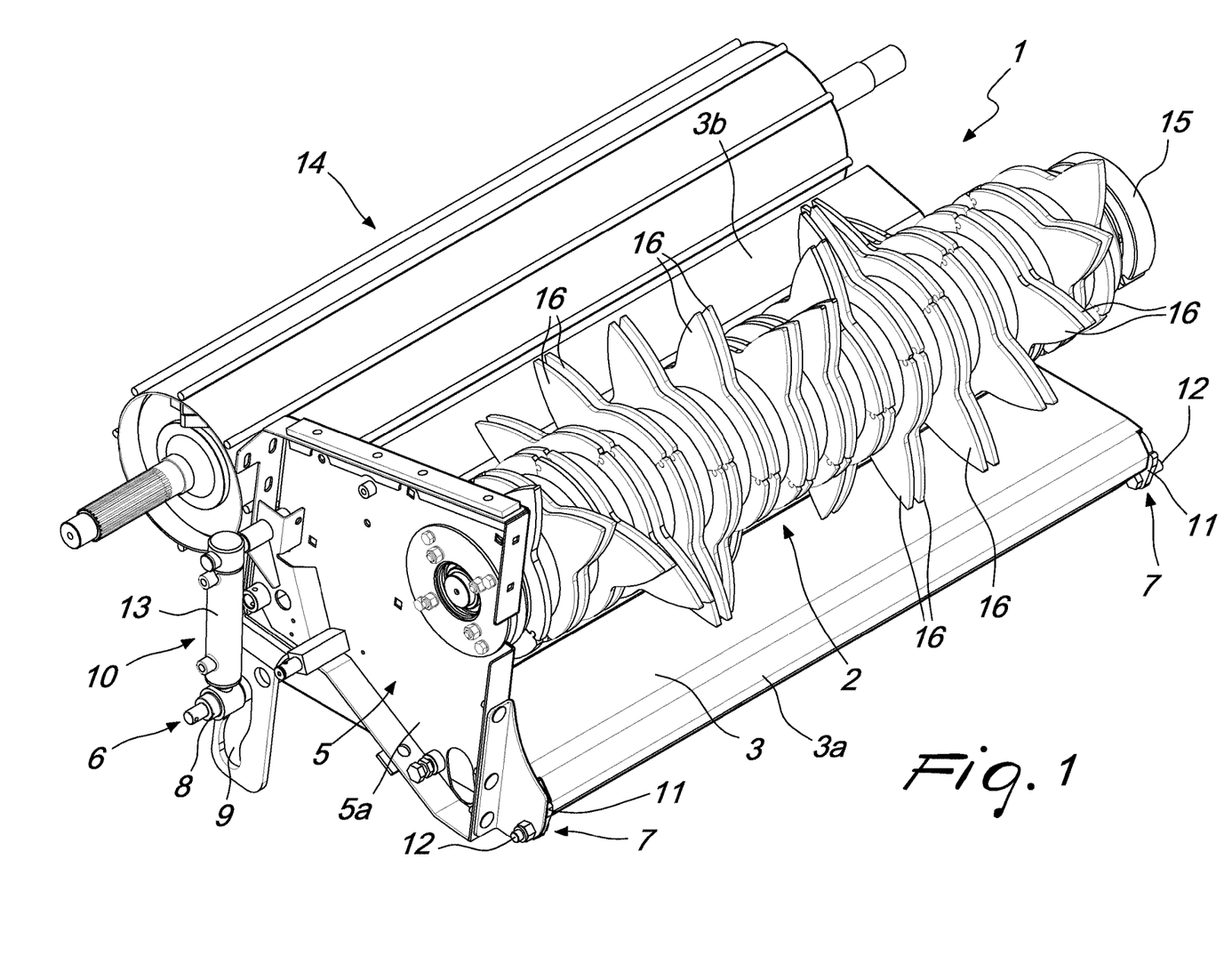
FIG. 1 is a right-hand perspective front schematic view of the apparatus according to the invention, in a first configuration of operation.
Figure 2:
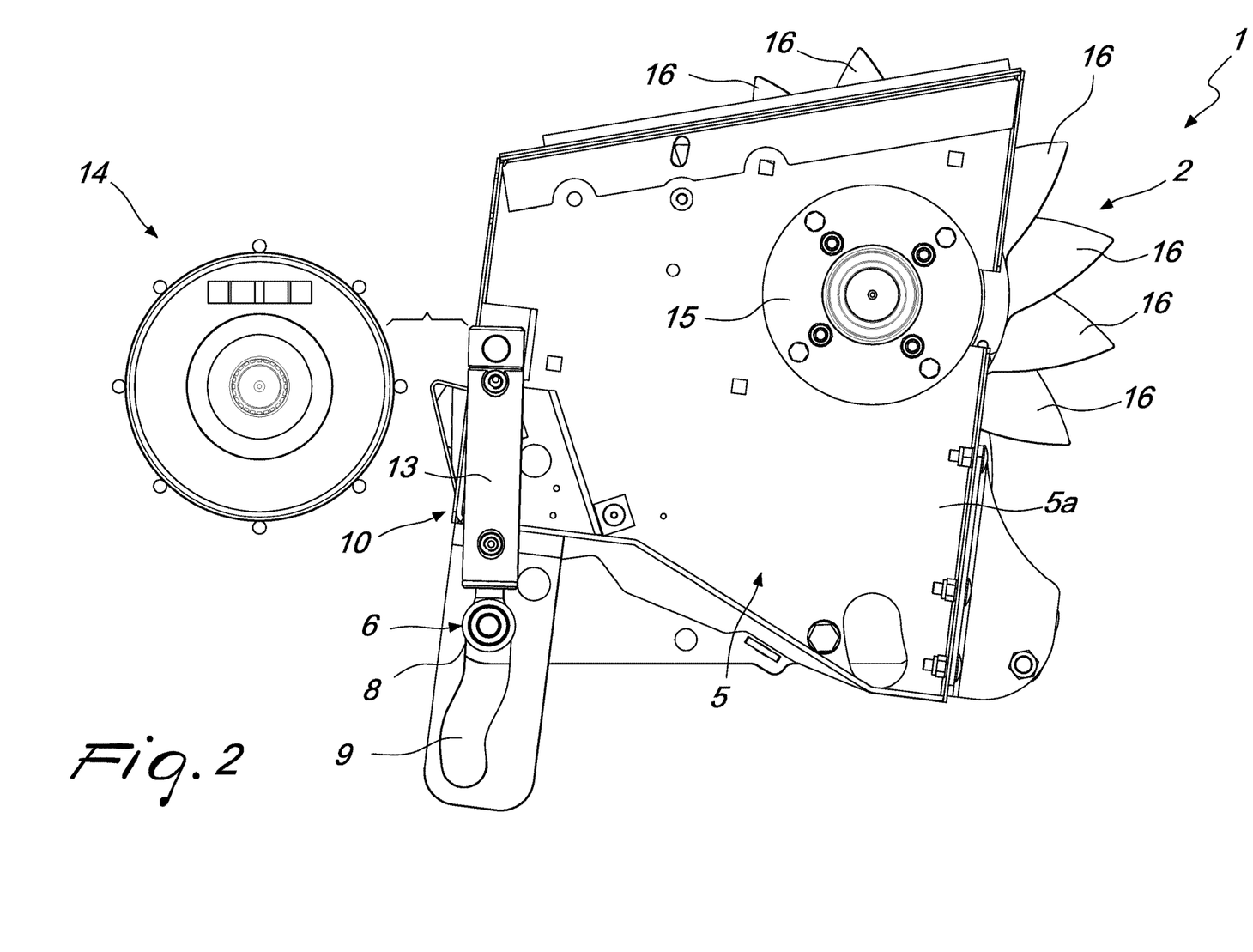
FIG. 2 is a right-hand side elevation view of the apparatus in FIG. 1.
Figure 3:
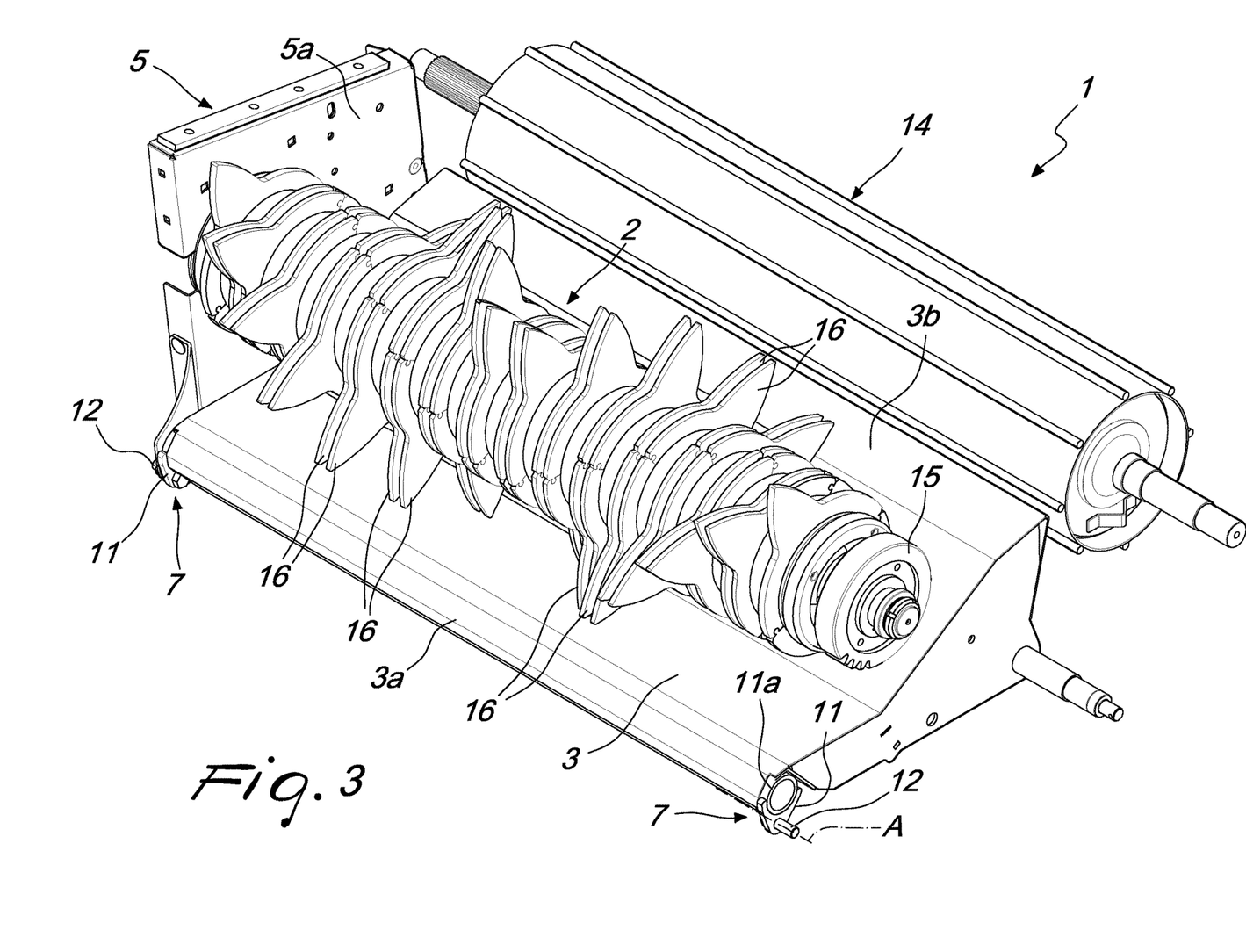
FIG. 3 is a left-hand perspective front schematic view of the apparatus in FIG. 1.
Figure 4:
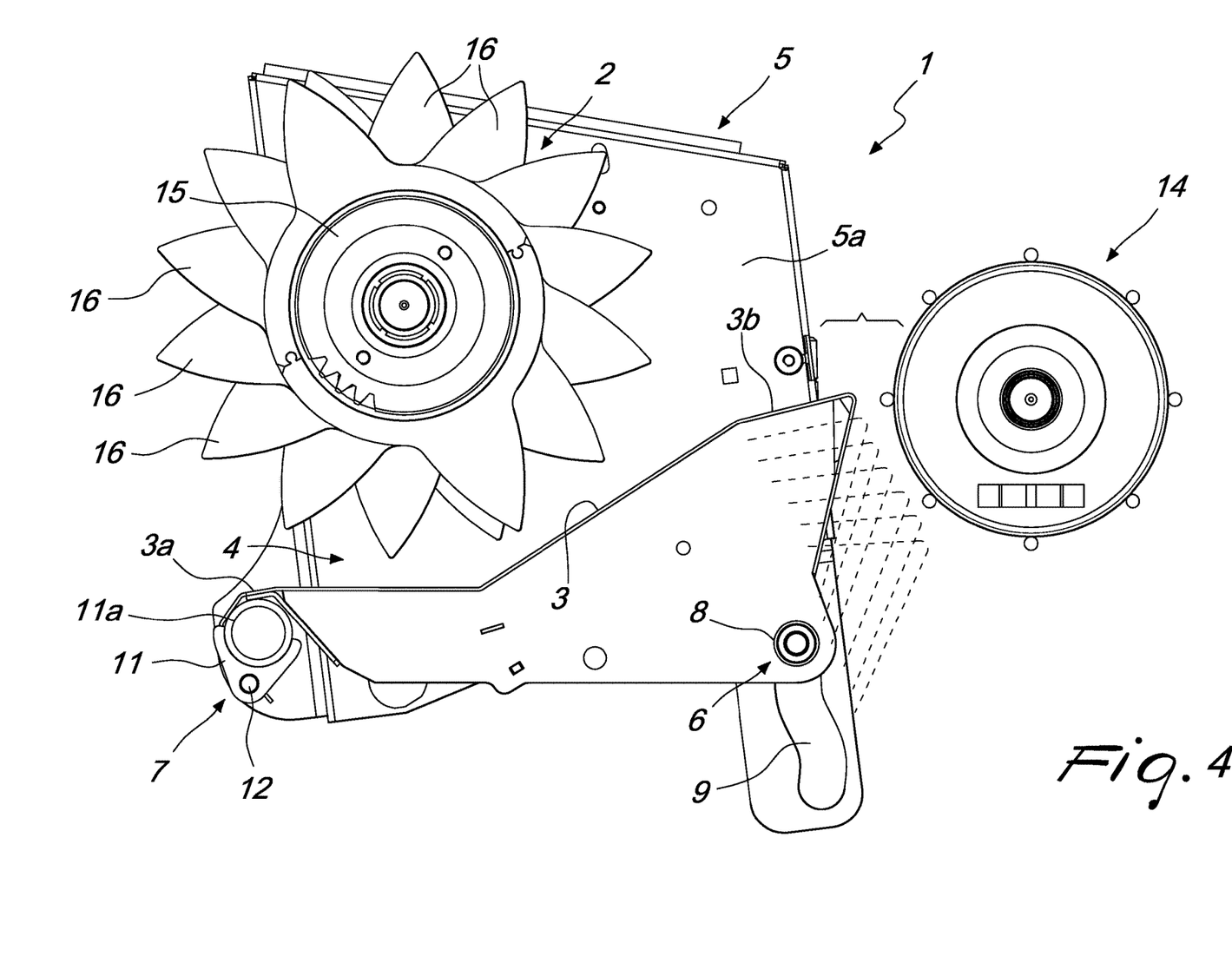
FIG. 4 is a left-hand side elevation view of the apparatus in FIG. 1.
Figure 5:
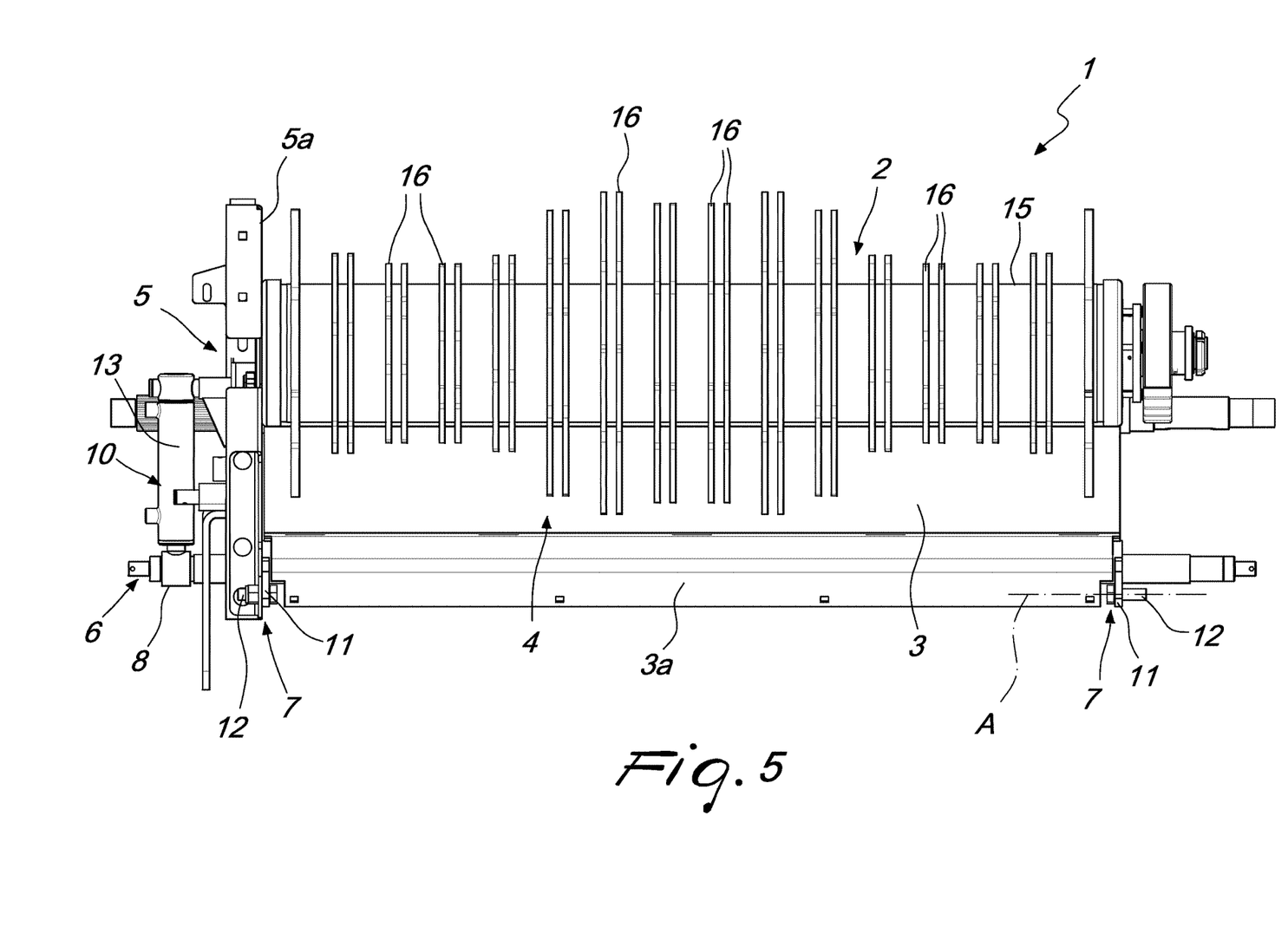
FIG. 5 is a front elevation view of the apparatus in FIG. 1.

Conveniently, the transfer apparatus 1 is normally kept in a first configuration, shown in FIGS. 1, 2, 3, 4 and 5, and corresponding to a minimal transverse cross-section of the channel 4: as has already been seen, thanks to a single degree of freedom being conferred on the deck 3, governed by the actuator 10 (although the possibility is not ruled out of providing apparatuses 1 in which the deck 3 is only resting on the crank 11 and/or on the tube 11a, and therefore is provided with a further degree of freedom), it is sufficient that such actuator 10 not impose any movement on the pin 8, in order to keep the deck 3 immobile (for example in the first configuration).

Figure 6:
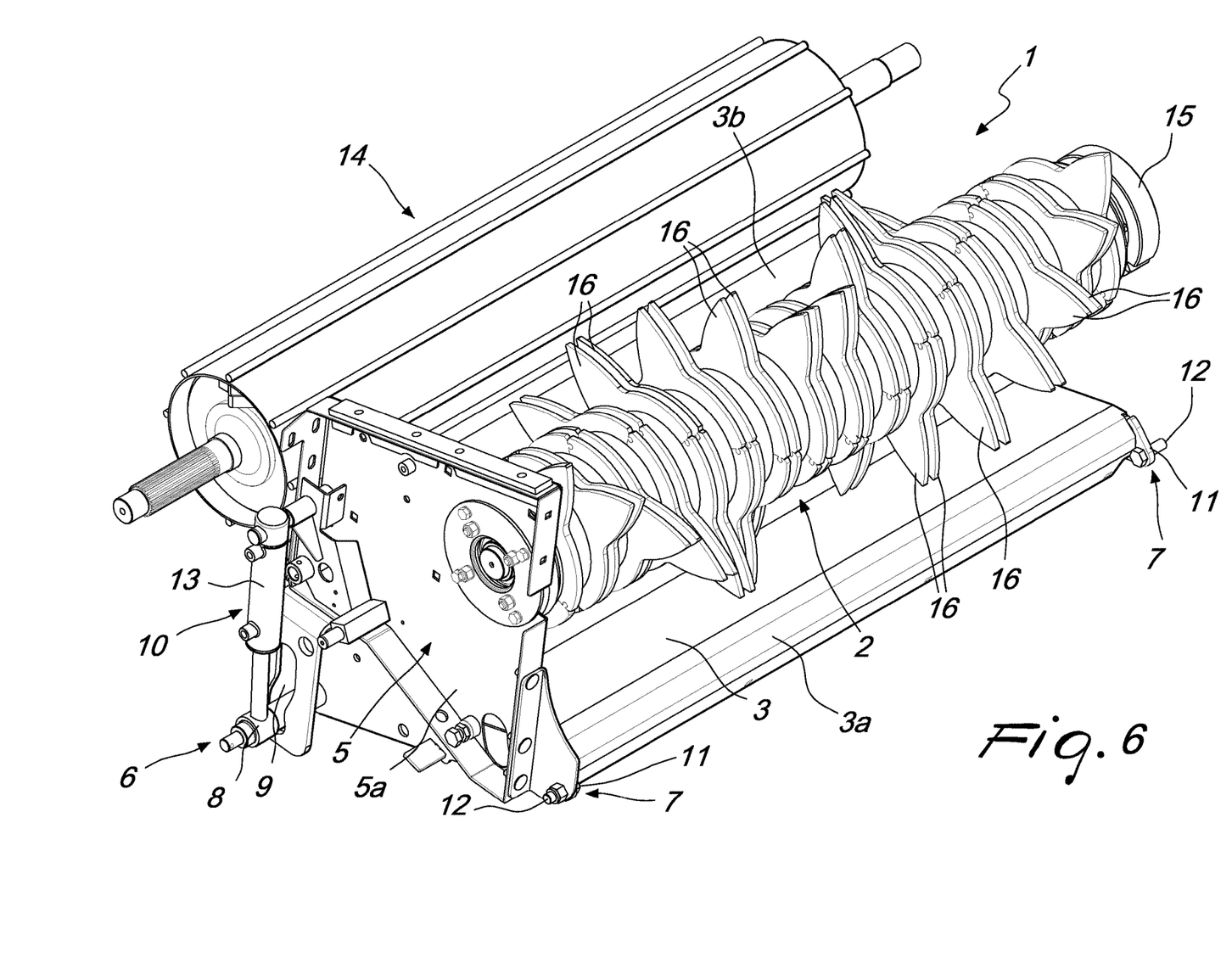
FIG. 6 is a right-hand perspective front schematic view of the apparatus according to the invention, in a second configuration of operation.
Figure 7:
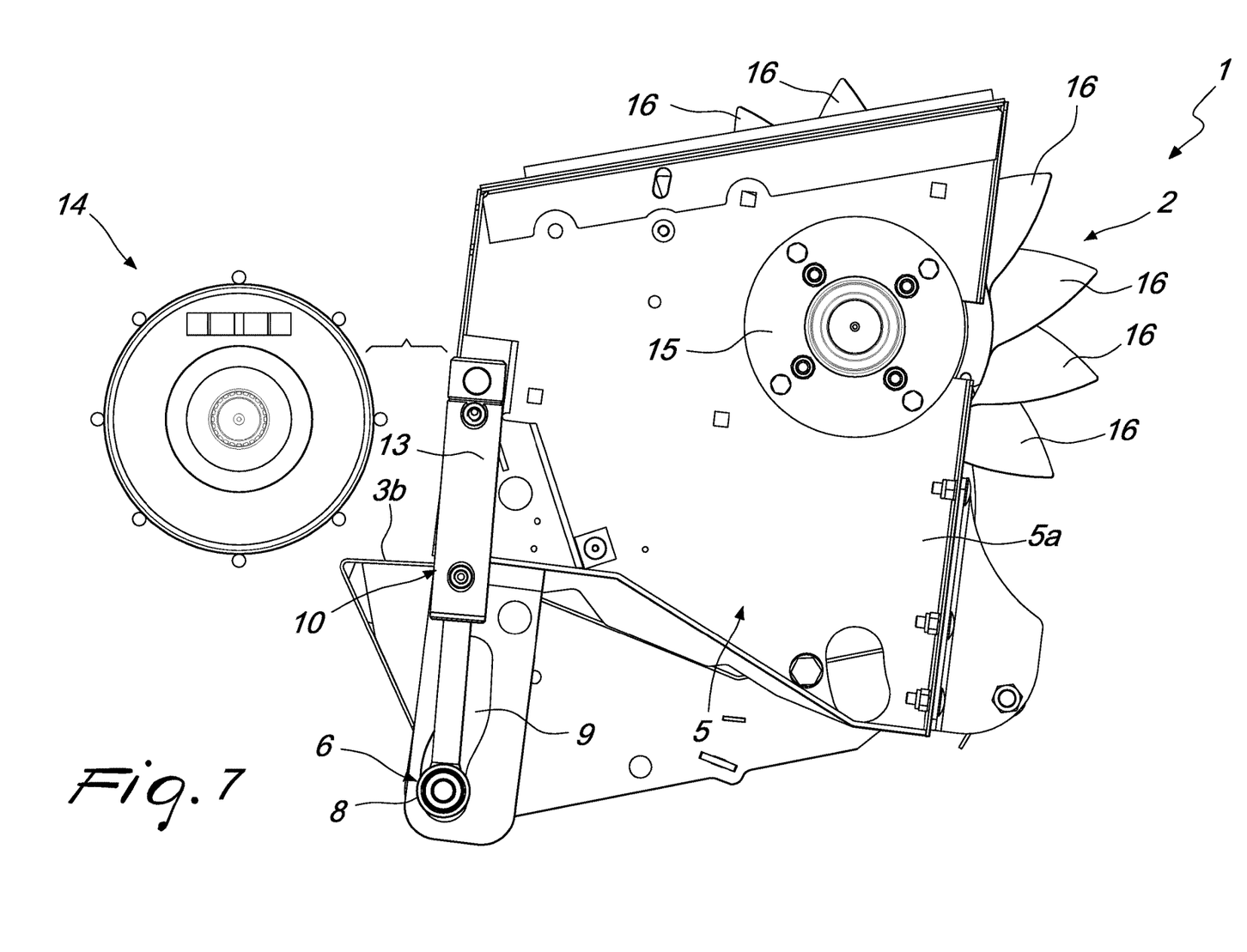
FIG. 7 is a right-hand side elevation view of the apparatus in FIG. 6.
Figure 8:
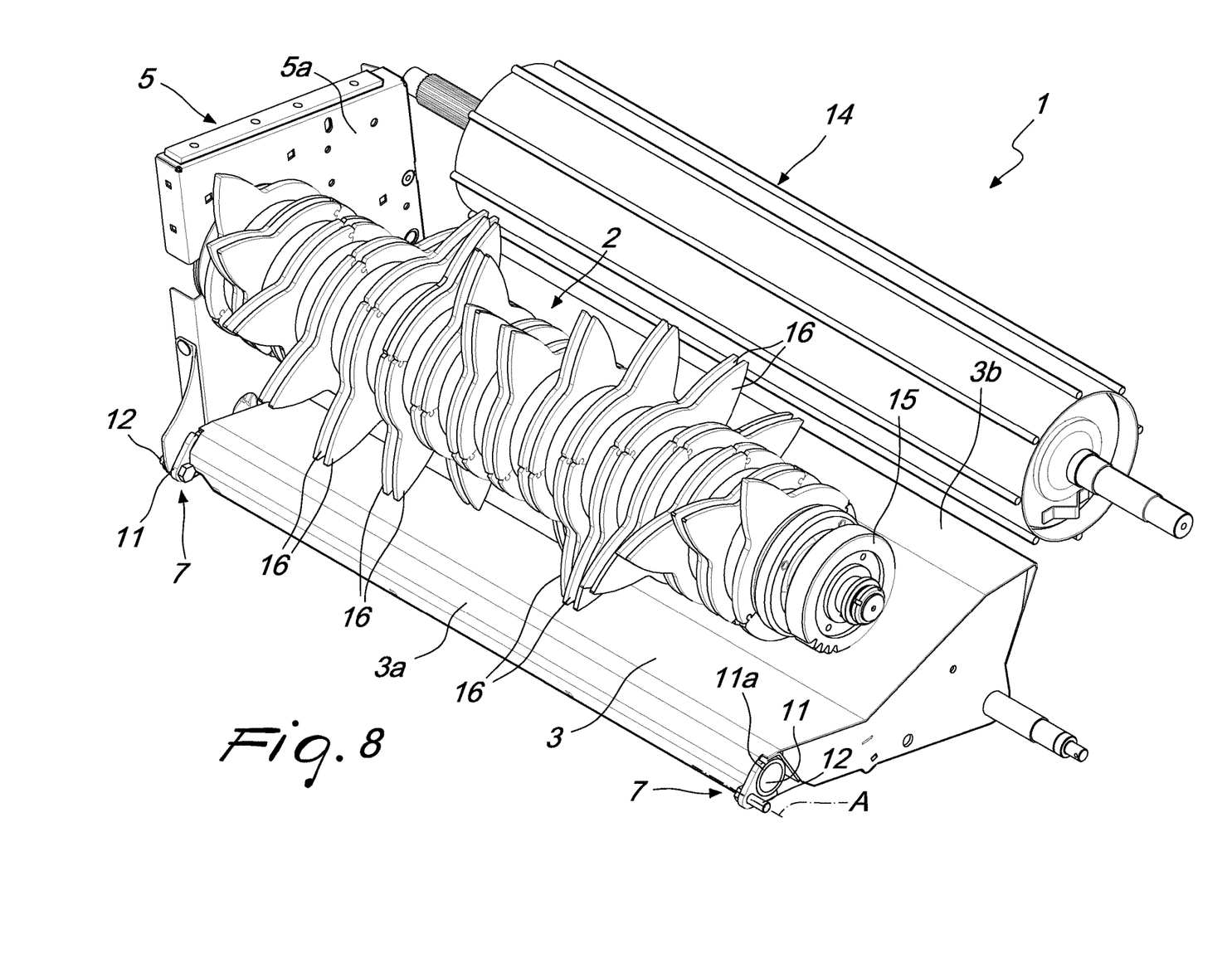
FIG. 8 is a left-hand perspective front schematic view of the apparatus in FIG. 6.
Figure 9:
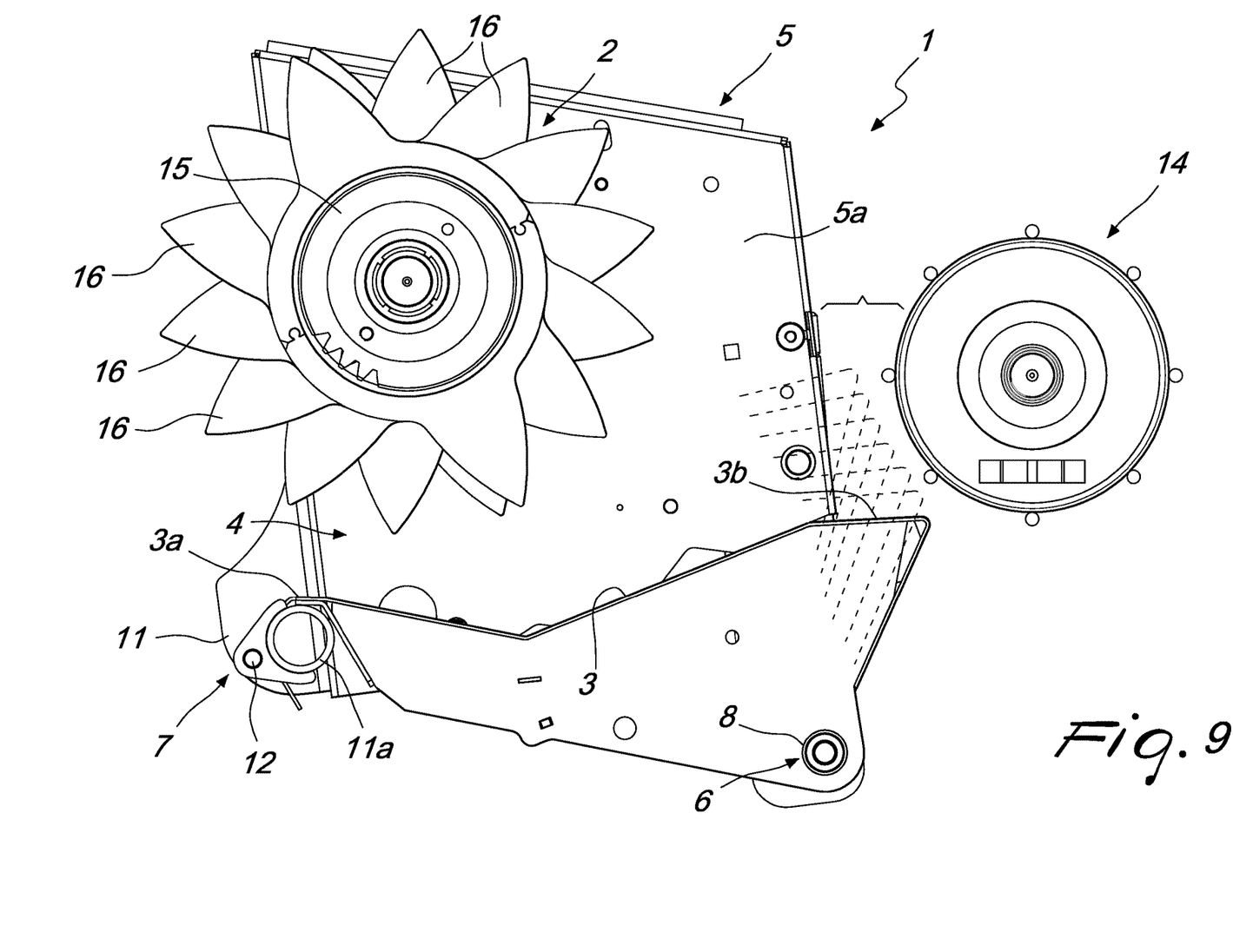
FIG. 9 is a left-hand side elevation view of the apparatus in FIG. 6.
Figure 10:
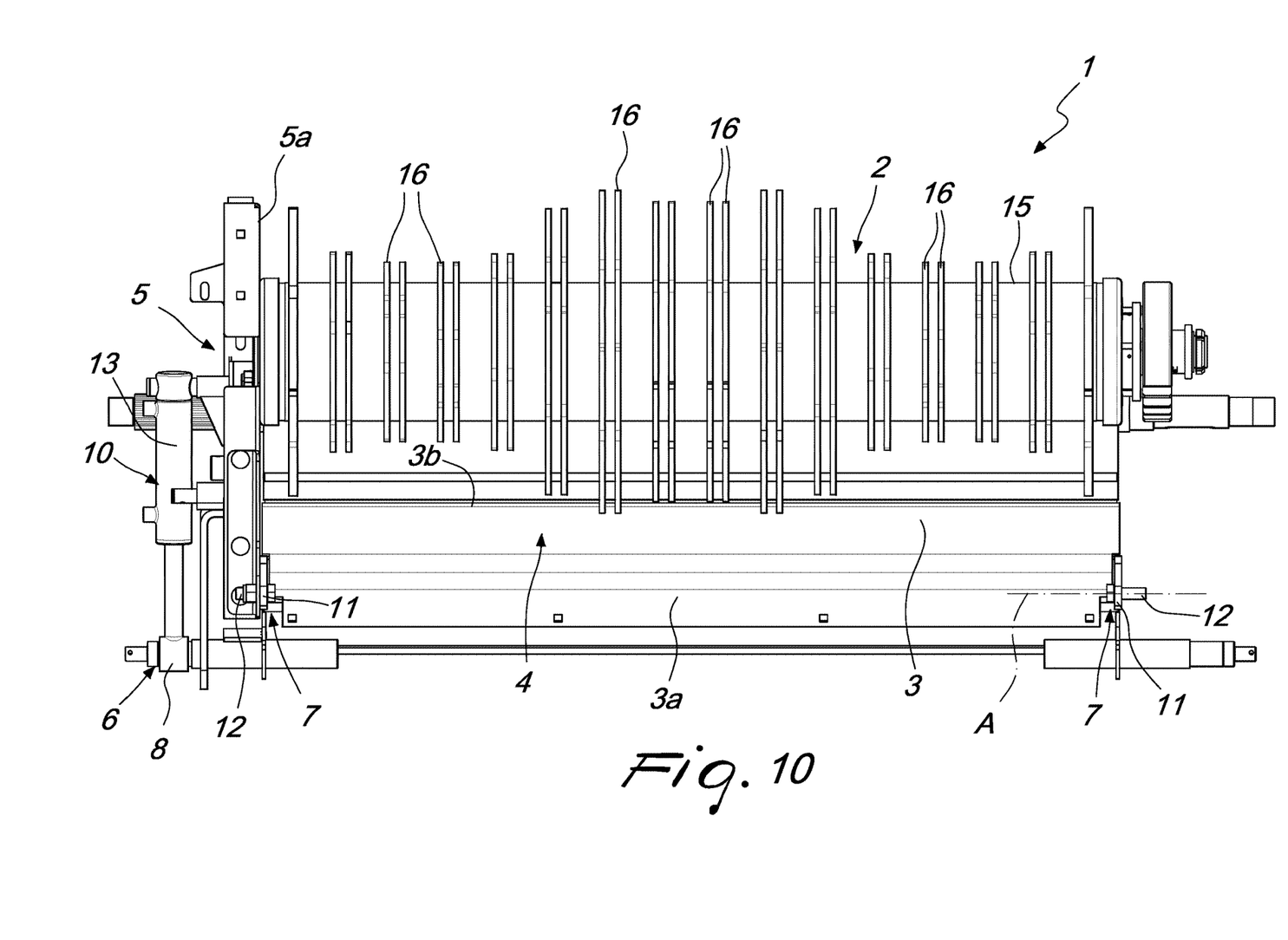
FIG. 10 is a front elevation view of the apparatus in FIG. 6.

Furthermore, the deck 3 can move from the first configuration to a second configuration, which is shown in FIGS. 6, 7, 8, 9 and 10, and corresponds to a maximal transverse cross-section of the channel 4, and vice versa, as a consequence of the movement of the pin 8 by the actuator 10, and of the consequent rotation of the crank 11 (entrained by the pin 8 and by the actuator 10).

In particular, in a possible embodiment, the actuator 10 is constituted by a hydraulic cylinder 13, which can be commanded by an operator in order to impose the transition from the first configuration to the second configuration (for example in the event of an excessive accumulation of agricultural products along the channel 4, such as to determine a blockage), and vice versa.

The transfer apparatus 1 can comprise two pins 8, mutually spaced apart and aligned along a reference axis that is parallel to the rotation axis A and which is perpendicular to the advancement direction: in such embodiment, each pin 8 is thus moved by a respective actuator 10 (constituted for example by a corresponding hydraulic cylinder 13).

It should still be noted however that apparatuses 1 that are provided with one or more actuators 10 of different types, according to specific applicative requirements, are also covered by the scope of protection claimed herein.

Furthermore, the apparatus 1 according to the invention can comprise two cranks 11, which are mounted idle, on opposite sides of the deck 3, about respective fulcra 12, which are aligned along the rotation axis A that is perpendicular to the advancement direction.

Conveniently, as can be seen from the figures, the guiding slot 9 is substantially S-shaped (or, at least, has a substantially curvilinear progression, and such as to form at least one bend): thus, when the operator actuates the actuator 10 (or the actuators 10) in order to pass from the first to the second configuration, a corresponding combined movement of retraction, along the advancement direction, and of lowering, toward the ground, is conferred on the deck 3, so as to define a path, for the deck 3, which is substantially shaped like a circular arc concentric to a roller 14 of the compression chamber, designed for the entrainment of the product itself and the formation of the bale.

Positively, in order to prevent the agricultural product taken from the pick-up drum from falling to the ground during its transfer to the compression chamber, the fixed frame 5 comprises two mutually facing and parallel side walls 5a, arranged at the sides of the deck 3 in order to delimit, together with the deck 3 itself and with the rotor 2, the transfer channel 4.

In the preferred embodiment, which is proposed for the purposes of non-limiting example of the application of the invention, the rotor 2 comprises a shaft 15, which rotates parallel to the rotation axis A of the crank 11 and which is above the deck 3: radially distributed along at least one portion of the shaft 15 (or for its entire length) is a plurality of pusher teeth 16, to which falls the task of pushing the agricultural products from the pick-up drum to the compression chamber.

Furthermore, with further reference to the preferred, but not exclusive, embodiment, the transfer apparatus 1 can comprise a plurality of radial blades, which are capable of cyclically exiting from respective slits that are provided along the deck 3, until they protrude into the channel 4.

More specifically, the radial blades can, alternatively, be raised thus protruding into the channel 4 (passing through the special slits provided in the deck 3) and be withdrawn below the deck 3 (again, through the respective slits). The blades, while they protrude into the channel 4, can thus shred the agricultural products during their transfer from the pick-up drum to the compression chamber, in order to facilitate the movement thereof (and reduce the risks of jamming) and simplify the activities of formation of the bale.

Moreover, the possibility is not excluded of providing apparatuses 2 in which the blades are distributed along the shaft 15 and alternate with the pusher teeth 16.

Thus the present discussion also relates to an agricultural machine, designed for the formation of bales, which comprises a pick-up drum of agricultural products, such as for example grass, grain, maize, hay, forage, and the like, and an apparatus 1 for the transfer of the agricultural products received from the pick-up drum to a compression chamber, which is designed for the formation of the bale.

The transfer apparatus 1 comprises at least one impeller rotor 2, which is arranged between the pick-up drum and the compression chamber and which is facing a deck 3, so as to delimit at least partially a channel 4 for the transfer of the agricultural products, which are pushed by the rotor 2, from the pick-up drum to the chamber.

According to the invention, the deck 3 is coupled to a fixed frame 5 by way of at least two supports 6 and 7 which can move on command. In more detail, as has been seen, at least one first support 6 comprises at least one support pin 8, which is coupled to a first portion of the deck 3 and moved, in a corresponding guiding slot 9, by a corresponding actuator 10. Furthermore, at least one second support 7 comprises at least one crank 11, which is coupled to a second portion of the deck 3 and can rotate about a rotation axis A that is perpendicular to the advancement direction.

The operation of the transfer apparatus (and of the agricultural machine) according to the invention is the following.

As has been seen, the agricultural machine equipped with the transfer apparatus 1 according to the invention can be moved along an agricultural terrain, basically following the windrows, in order to retrieve from the ground, by way of the pick-up drum, the agricultural products (of any type) that constitute those windrows.

In fact the pick-up drum (which for example is constituted by a cylindrical drum, rotating parallel to the ground and at right angles to the advancement direction), is provided with radial teeth for picking up, with which it can lift the previously-cut agricultural products that the agricultural machine progressively encounters, until it brings them to its shoulders, substantially at the inlet of the transfer channel 4.

As has been seen, in the transfer channel 4 (which is delimited in an upward region by the rotor 2, in a downward region by the deck 3, and at the sides by the walls 5a), the agricultural product is pushed toward the compression chamber by the pusher teeth 16 with which the shaft 15 is provided (optionally also undergoing the cutting action of blades, in order to shred the agricultural products further and simplify both the transfer and the subsequent compression).

Under normal operating conditions, the deck 3 is kept in the first configuration and prevents the agricultural products from falling to the ground, and thus the products arrive at the chamber in which they are compressed until they form the desired bale (cylindrical for example).

It has already been seen that, when the pick-up drum encounters and lifts great localized accumulations of product, the heavy mass of material transferred in a short time to the transfer channel 4 causes the jamming of the rotor 2 (with consequent interruption of the feeding), since the pusher teeth 16 cannot fully penetrate between the product, and they jam, and thus the rotor 2 cannot transfer the gathered material to the compression chamber.

In order to overcome such drawback, and restore the normal operation of the transfer apparatus 1 (and of the agricultural machine) according to the invention, the operator need only activate (by way of a respective control panel) the hydraulic cylinders 13 (or other actuators 10 that may optionally be provided).

In fact, the hydraulic cylinders 13 force the movement of the pins 8 within the respective guiding slots 9, causing first of all the lowering (according to the stroke preset by the chosen shape of the slots 9) of the rear flap 3b of the deck 3 (i.e. proximate to the outlet of the transfer channel 4, and of the compression chamber).

Furthermore, the movement of the pins 8 entrains in rotation the crank 11 (or the cranks 11), which are mounted idle about the fulcrum 12, thus forcing the lowering of the front flap 3a of the deck 3 (i.e. proximate to the inlet of the transfer channel 4, and of the pick-up drum).

The deck 3 is thus brought to the second configuration, appreciably widening the cross-section of the passage offered to the agricultural product for the entire length of the transfer channel 4 (in that the deck 3 is lowered both at the compression chamber and proximate to the pick-up drum), thus ensuring the removal of the blockage and ensuring the transfer of agricultural products toward the compression chamber, even in the event of heavy accumulations of those products.

After having resolved the blockage, the operator can command the restoration of the first configuration, and normally resume the activities of gathering, transfer and compression of the agricultural products, for the formation of bales.

It should furthermore be noted that the described result is achieved with a structure that is simple and low cost, in that it simply necessitates one or two hydraulic cylinders 13 (or other actuators 10) and the previously-described supports 6 and 7.

Moreover, it seems evident that in the event of jamming, the operator simply has to actuate the actuators 10, without thus being required to perform other, more laborious activities (for example the manual removal of the blockage, as is often required when employing conventional agricultural machines), thus ensuring the removal of the blockage very rapidly and easily.

It should furthermore be noted that, during the transition from the first to the second configuration, the combination of lowering and retraction movements which is determined by the supports 6 and 7 (and in particular by the shape adopted for the guiding slot 9), determines, for the deck 3, a path (shown in broken lines in FIG. 4 and in FIG. 9) substantially shaped like a circular arc, concentric to the roller 14.

Such choice makes it possible to optimize the play between the deck 3 and the above mentioned roller 14, and makes it possible to obtain the maximum possible passage cross-section, for the same stroke of the cylinders 13.

In practice it has been found that the apparatus and the machine according to the invention fully achieve the set aim and objects, in that the use of a deck delimiting, together with an impeller rotor, a channel for transferring the agricultural products, and coupled to a fixed frame by way of at least two supports which can move on command, the first of which comprises at least one support pin that is moved, in a corresponding guiding slot, by a corresponding actuator, while the second comprises at least one crank, which can rotate about a rotation axis that is perpendicular to the advancement direction, makes it possible to provide an apparatus that is capable of transferring agricultural products toward the compression chamber, even in the event of heavy accumulations of those products.

The invention, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The disclosures in European Patent Application No. 13425158.6 from which this application claims priority are incorporated herein by reference.

The invention claimed is:

1. An apparatus for transferring agricultural products, for an agricultural machine designed for the formation of a bale, comprising:

an impeller rotor, which can be arranged between a pick-up drum of agricultural products, of the type of grass, grain, maize, hay and forage, and a compression chamber, wherein the impeller rotor rotates about a first rotation axis oriented in a longitudinal direction and includes a plurality of flaps arranged perpendicularly to the longitudinal direction and spaced one with respect to the other along the longitudinal direction, each flap of said plurality of flaps including one or more teeth;

a deck, facing the impeller rotor and distanced from the impeller rotor along a transverse direction perpendicular to the longitudinal direction, to form a channel for transferring the agricultural products from the pick-up drum to the compression chamber along an advancement path transverse to the longitudinal direction, said channel being delimited by the deck and by the impeller rotor, wherein the impeller rotor is configured to push the agricultural products from the pick-up drum to the compression chamber along the advancement path, wherein the deck has a first portion and a second portion opposite the first portion with respect to the advancement path, a first support and a second support for coupling the deck to a frame of the agricultural machine, wherein the first support is coupled to the first portion of the deck and the second support includes a crank, wherein the crank is coupled to the second portion of the deck and rotates about a second rotation axis, the second rotation axis being oriented along the longitudinal direction, spaced from the first rotation axis, an actuator, connected to the first support and configured to move the deck between a first configuration, corresponding to a minimal transverse cross-section of the channel, and a second configuration, corresponding to a maximal transverse cross-section of the channel, wherein the second portion of the deck is at a first vertical height, in the first configuration of the deck, and at a second vertical height, in the second configuration of the deck, the second vertical height being lower than the first vertical height, wherein displacement of the second portion of the deck between the first and the second vertical heights is accomplished through rotation of the crank.

2. The transfer apparatus according to claim 1, wherein the crank is mounted idle about a respective fulcrum, and rotates about the second rotation axis as a consequence of the movement of the first support, by the actuator.

3. The transfer apparatus according to claim 1, wherein the crank is arranged in proximity to an inlet of the channel, facing the pick-up drum, and wherein the first support is arranged in proximity to an outlet of the channel, facing the compression chamber.

4. The transfer apparatus according to claim 1, wherein the actuator includes a hydraulic cylinder, which can be commanded by an operator for transition from the first configuration to the second configuration, and vice versa.

5. The transfer apparatus according to claim 1, wherein the fixed frame comprises two side walls being mutually facing and parallel, arranged at opposite sides of the deck delimiting, together with the deck and with the impeller rotor, the transfer channel.

6. The transfer apparatus according to claim 1, wherein the impeller rotor comprises:
a shaft that rotates parallel to the second rotation axis, and
a plurality of pusher teeth, being radially distributed along at least one portion of the shaft, and being configured to push the agricultural products from the pick-up drum to the compression chamber.

7. The transfer apparatus according to claim 6, further comprising a plurality of radial blades, which cyclically exit from respective slits that are provided along the deck, until they protrude into the channel, in order to shred the agricultural products during their transfer from the pick-up drum to the compression chamber.

8. The transfer apparatus according to claim 1, wherein the crank includes a tube coupled to the second portion of the deck, wherein the second portion of the deck rests on the tube.

9. The transfer apparatus according to claim 8, wherein the tube is elongated along a tube axis, the tube axis being spaced apart from the second rotation.

10. The transfer apparatus according to claim 1, wherein, the first portion of the deck is at a third vertical height, in the first configuration of the deck, and at a fourth vertical height, in the second configuration of the deck, the fourth vertical height being lower than the third vertical, so that in the second configuration of the deck, both the first portion of the deck and the second portion of the deck are lowered with respect to the first configuration, to widen the cross-section of the channel.

11. The transfer apparatus according to claim 1, wherein the first support includes a support pin, coupled to the first portion of the deck and movable, in a corresponding guiding slot, by the actuator.

12. The transfer apparatus according to claim 11, wherein the deck is movable from the first configuration to the second configuration, and vice versa, as a consequence of movement of the pin, by the actuator, and a consequent rotation of the crank about the second rotation axis.

13. The transfer apparatus according to claim 11, wherein the actuator includes at least one hydraulic cylinder connected to the support pin to move the support pin within the corresponding guiding slot.

14. The transfer apparatus according to claim 1, wherein the deck includes a front flap defining the second portion of the deck, wherein the crank is rotatably connected to the front flap.

15. The transfer apparatus according to claim 14, wherein the crank includes a tube and the front flap of the deck is rotatably wrapped around the tube.

16. The transfer apparatus according to claim 1, wherein the actuator is operatively coupled to the deck, to cause movement of the deck from the first configuration to the second configuration following activation of the actuator by an operator.

17. The transfer apparatus according to claim 16, wherein the the actuator is further operable to move the deck from the second configuration to the first configuration.

18. An agricultural machine for formation of a bale, comprising:
a pick-up drum configured for picking up agricultural products, of the type of grass, grain, maize, hay and forage;
a compression chamber, configured for the formation of the bale;
a transfer apparatus, for transferring the agricultural products received from the pick-up drum to the compression chamber, wherein the transfer apparatus includes:
an impeller rotor, which is configured to be arranged between the pick-up drum and the compression chamber, wherein the impeller rotor rotates about a first rotation axis oriented in a longitudinal direction and includes a plurality of flaps arranged perpendicularly to the longitudinal direction and spaced one with respect to the other along the longitudinal direction, each flap of said plurality of flaps including one or more teeth;
a frame; and
a deck, facing the impeller rotor and distanced from the impeller rotor along a transverse direction perpendicular to the longitudinal direction, to form a channel for transferring the agricultural products from the pick-up drum to the compression chamber along an advancement path transverse to the longitudinal direction, said channel being delimited by the deck and by the impeller rotor, wherein the impeller rotor is configured to push the agricultural products from the pick-up drum to the compression chamber along the advancement path, wherein the deck has a first portion and a second portion opposite the first portion with respect to the advancement path, a first support and a second support, for coupling the deck to the frame, wherein the first support is coupled to first portion of the deck, and the second support includes a crank, wherein the crank is coupled to a second portion of the deck and rotates about a second rotation axis, the second rotation axis being oriented along the longitudinal direction, spaced from the first rotation axis, an actuator, connected to the first support and configured to move the deck between a first configuration, corresponding to a minimal transverse cross-section of the channel, and a second configuration, corresponding to a maximal transverse cross-section of the channel, wherein the second portion of the deck is at a first vertical height, in the first configuration of the deck, and at a second vertical height, in the second configuration of the deck, the second vertical height being lower than the first vertical height, wherein displacement of the second portion of the deck between the first and the second vertical height is accomplished through rotation of the crank.

19. The agricultural machine according to claim 18, wherein the crank includes a tube coupled to the second portion of the deck, wherein the second portion of the deck rests on the tube.

20. The agricultural machine according to claim 19, wherein the tube is elongated along a tube axis, the tube axis being spaced apart from the second rotation axis.

* * * * *